(12) United States Patent
Tinde

(10) Patent No.: US 10,569,905 B2
(45) Date of Patent: Feb. 25, 2020

(54) SYSTEM FOR DELIVERING PRE-CONDITIONED AIR TO AN AIRCRAFT ON THE GROUND

(75) Inventor: Johan Tinde, Dietzenbach (DE)

(73) Assignee: IPALCO B.V. (NL)

( * ) Notice: Subject to any disclaimer, the term of this patent is extended or adjusted under 35 U.S.C. 154(b) by 10 days.

(21) Appl. No.: 14/111,911

(22) PCT Filed: Apr. 13, 2012

(86) PCT No.: PCT/EP2012/056856
§ 371 (c)(1),
(2), (4) Date: Dec. 24, 2013

(87) PCT Pub. No.: WO2012/140247
PCT Pub. Date: Oct. 18, 2012

(65) Prior Publication Data
US 2014/0102125 A1    Apr. 17, 2014

(30) Foreign Application Priority Data
Apr. 15, 2011  (LU) .......................................... 91808

(51) Int. Cl.
*B64F 1/36*     (2017.01)
(52) U.S. Cl.
CPC ................... *B64F 1/364* (2013.01)
(58) Field of Classification Search
CPC ......... B64F 1/362; B64F 1/364; F24F 5/0085; F24F 2011/0042; F24F 2011/0087; F25B 9/004; F25B 2313/0291; F25B 2313/0312; B64D 13/04; B64D 2013/0666; G01F 1/46; G01F 15/18; G01F 15/185
See application file for complete search history.

(56) References Cited

U.S. PATENT DOCUMENTS

| | | | | |
|---|---|---|---|---|
| 3,913,833 A | * | 10/1975 | Minett ............... | B60H 1/00007 137/805 |
| 5,111,827 A | * | 5/1992 | Rantala ................... | A61B 5/087 600/532 |
| 5,121,739 A | * | 6/1992 | Barker .................... | F02N 19/02 123/142.5 R |
| 5,736,651 A | * | 4/1998 | Bowers ..................... | G01F 1/46 73/861.66 |

(Continued)

FOREIGN PATENT DOCUMENTS

DE    29702259    6/1997
GB     771756     4/1957

(Continued)

*Primary Examiner* — Christopher R Zerphey
(74) *Attorney, Agent, or Firm* — Grogan, Tuccillo & Vanderleeden, LLP

(57) ABSTRACT

A system for providing pre-conditioned air to an aircraft on the ground includes a ground air conditioning unit configured to produce air-conditioned air, a control module for controlling operation of the air conditioning unit, and an air hose having a first end in communication with a pre-conditioned air outlet of the air conditioning unit and a second end having a connector for connection to an aircraft on the ground. A pressure sensing device provides pressure information to the control module and is arranged so as to allow pressure monitoring of the flow of pre-conditioned air in the vicinity of the second end of the air hose.

17 Claims, 3 Drawing Sheets

(56) References Cited

U.S. PATENT DOCUMENTS

| | | | |
|---|---|---|---|
| 7,115,097 B2 * | 10/2006 | Johnson | A61M 16/0051 600/538 |
| 7,406,880 B2 * | 8/2008 | Orleskie | G01F 1/34 73/861.52 |
| 2005/0211309 A1 * | 9/2005 | Igarashi | G05D 16/04 137/557 |
| 2006/0123804 A1 * | 6/2006 | Widegren | F24F 5/0085 62/97 |
| 2007/0101756 A1 * | 5/2007 | Okuda | F25B 9/004 62/402 |
| 2007/0235587 A1 * | 10/2007 | Delort | B64F 1/364 244/114 R |
| 2008/0132160 A1 * | 6/2008 | Han | D06F 58/00 454/344 |
| 2009/0108552 A1 * | 4/2009 | Mann, III | B64F 1/364 280/79.3 |
| 2011/0177771 A1 * | 7/2011 | Kelnhofer | B64D 13/00 454/76 |

FOREIGN PATENT DOCUMENTS

| | | |
|---|---|---|
| WO | 2004000646 A2 | 12/2003 |
| WO | 2004024561 A1 | 3/2004 |
| WO | 2010106520 | 9/2010 |

* cited by examiner

SYSTEM FOR DELIVERING PRE-CONDITIONED AIR TO AN AIRCRAFT ON THE GROUND

CROSS-REFERENCE TO RELATED APPLICATIONS

This application is entitled to the benefit of and incorporates by reference essential subject matter disclosed in International Application No. PCT/EP2012/056856 filed on Apr. 13, 2012 and Luxemburg Patent Application No. 91808 filed on Apr. 15, 2011.

FIELD OF THE INVENTION

The present invention generally relates to a system for supplying pre-conditioned air to an aircraft when it is stationary on the ground.

BACKGROUND OF THE INVENTION

Due to environmental aspects and increasing fuel prices the on-board air conditioning system is preferably turned off during the time an aircraft is parked on the ground, while the high density of passengers, the interior lighting, the large number of windows and the heavily insulated fuselage all contribute to raising the temperature of the cabin to uncomfortable levels, even without taking into account the local weather conditions. To deal with this situation, preconditioned air is conventionally supplied to the aircraft directly into the aircraft ventilation system. This may be done by connecting the aircraft either to a remote air conditioning unit, to an air conditioning unit fixed to the telescopic corridor of the terminal, or to a portable air conditioning unit, which is towed close to the aircraft.

WO2004/000646 e.g. relates to such air conditioning unit, which is affixed under the telescopic passenger bridge/corridor.

GB 771,756 discloses a towable air conditioning unit operating on the air cycle principle that can be easily moved towards an aircraft on the ground.

WO 2004/024561 describes an environmentally friendly device for supplying preconditioned air to an aircraft on the ground operating on the air cycle principle which, similar to the air conditioning systems generally installed in all modern aircrafts, provides refrigeration without the use of CFC gases. A great advantage of this device is its design as a rolling, self-contained device that is supplied with compressed air produced at a remote location (e.g. in a compressor in the airport building) through a compressed air hose, avoiding the need for a motor-driven compressor within the movable device itself.

The actual delivery of the preconditioned air is then done through a flexible and usually insulated air hose that connects the ground air conditioning unit with the internal ventilation system of the aircraft, possibly via intermediate, rigid and insulated air ducts.

As it will be understood, the use of such ground air conditioning units will be particularly useful under hot and humid weather conditions. The use of such devices is critical in the Middle East and in certain Asian countries for the comfort of passengers during boarding. Unfortunately, it has been observed that in these countries, where large airports have been and are being constructed, the average operating temperatures are often too high for a rapid cooling (known as "pull down") of the aircraft with conventional ground air conditioning units. Similarly, it is difficult with conventional ground air conditioning units to maintain a comfortable cabin temperature with the full passenger load and with the heat-generating modern in-flight entertainment systems in operation, and this is even more critical for large commercial aircraft, such as the Airbus A 380-800, where the ratio of passengers in relation to cabin volume is particularly high.

SUMMARY OF THE INVENTION

The object of the present invention is to provide an alternative type of ground air conditioning system, which is adapted to take into account the ground cooling requirements of modern commercial aircrafts.

The present invention has been developed from findings that the cooling performance of conventional ground air-conditioning units is often inadequate under hot weather conditions, and with the objective of providing a unit that can safely and reliably provide more cooling power that is possible with current available systems.

A ground air conditioning system for an aircraft on the ground in accordance with the present invention comprises:
 a ground air conditioning unit configured to produce pre-conditioned air;
 a control module adapted to control the operation of the air conditioning unit;
 an air hose having a first end in communication with a pre-conditioned air outlet of the air conditioning unit and a second end with a connector for connection to an aircraft on the ground;
 According to an important aspect of the invention, pressure sensing means providing pressure information to the control module are so arranged as to allow pressure monitoring of the flow of pre-conditioned air in the vicinity of the second end of the air hose, i.e. as closely as possible to the aircraft inlet.

An advantageous aspect of the present ground air conditioning system is due to the pressure sensing means that allows controlling the system, through the control unit, using accurate information on the current flow conditions at the very end of the system, i.e. about its connection to the aircraft. Hence pressure monitoring at the interface with the aircraft ground air connection point and closed-loop control of the operating conditions are rendered possible.

This is an important difference with conventional ground cooling systems, which may have been equipped with a pressure sensor installed at the output of air conditioning unit itself, but not at the end of the air hose delivering the preconditioned air to the aircraft. Pressure sensors were thus conventionally simply used to check the proper operation of the ground cooling unit, but not to monitor the pressure at the interface with the aircraft.

In practice, the pressure sensing means will permit monitoring the pressure at the aircraft's inlet and thus avoiding excess pressure variations towards the aircraft that may damage the aircraft's ventilation system; in such event, the control module may advantageously be configured to stop or reduce the supply (mass flow) of conditioned air to the aircraft.

In this connection, as will be readily apparent to those skilled in the art, the pressure feedback provided by the pressure sensing means can be exploited in several ways to control and improve the operation of the system.

Another benefit afforded by the availability of the pressure information is that cold conditioned air—at temperatures significantly below those currently available with conventional devices—can be delivered to aircrafts; i.e. subfreezing air. Indeed, up to now, general regulations specified by aircraft manufacturers and aviation standards stipulate a minimum temperature of +1° C. or +2° C. for preconditioned air supplied from the ground (aircraft inlet temperature). One reason has been to avoid freezing problems in aircraft ventilation systems, since no monitoring of the actual flow conditions into the aircraft was undertaken.

The possibility of monitoring/detecting the pressure, and thus avoiding over-pressurization in the aircraft ventilation system, as may be caused by icing or excessive airflow, makes it possible to use sub-freezing air with many modern aircrafts. Therefore, according to one embodiment, the present system is designed to deliver pre-conditioned air at subfreezing temperature into the aircraft's low pressure ground cooling inlet connection, for example, at subfreezing temperatures down to −25° C.

When introducing sub-freezing air into the aircraft the recirculation fans of the aircraft's ventilation system should preferably be running to prevent freezing problems. The pressure sensing means may also be of interest for detecting the operation of the fans; the stopping of the fans can namely be detected by a resulting reduction of pressure at the interface with the aircraft through the pressure sensing means. Accordingly, the control unit may be configured to disable the production or reduce the mass flow of pre-conditioned air, especially at sub-freezing temperature, when the pressure information indicates that the measured pressure has reached or dropped below a threshold corresponding to a minimum pressure.

It will be appreciated that the ability to safely deliver subfreezing preconditioned air to parked aircrafts is a tremendous achievement in the field, because it significantly improves the ability of cooling down very large capacity aircrafts, such as the Airbus A 380-800, under hot and humid ambient conditions in for example, the Middle East and certain Asian countries.

For safety reasons, the pressure sensing means is advantageously designed to be redundant. Furthermore, it may be designed to measure the static pressure of the pre-conditioned air flow. Accordingly, the pressure sensing means may comprise at least two pressure sensors arranged on the flow of preconditioned in the vicinity of the aircraft. A convenient possibility is to integrate these sensors within the connector. For example, the pressure measurement may be carried out at the periphery of the airflow in the connector, providing reliable static pressure information.

Preferably, the air conditioning unit operates on the air-cycle principle, which has the advantage of working well in hot and humid ambient conditions and permits a high cooling performance, and can deliver subfreezing temperatures. Compressed air (preferably dry) for expansion in the air conditioning unit (hence on the basis of air-cycle) may advantageously be produced by a remote compressor unit and delivered to the air conditioning unit by means of one or more compressed air hoses. This allows a lighter design of the air conditioning unit and avoids the need for a motor-driven compressor near the aircraft.

However, the air conditioning unit may operate on the basis on any other appropriate technology, such as, for example, a conventional vapour-compression refrigeration system, in order to cool down air to be forwarded into the aircraft.

A further improved control of the system can be achieved with a feedback in the control module of air flow conditions within the aircraft ventilation system, namely of the temperature in a mixing chamber of the aircraft ventilation system. Additionally the air temperature in the cabin may provide useful information for the regulation of the production of pre-conditioned air in the ground air conditioning unit. Accordingly, the control unit may be configured to receive temperature information from the aircraft for an improved control of the delivery of conditioned air, namely the temperature of the mixing chamber and/or of the cabin temperature. This information can be transferred from the aircraft to the control module in a wired or wireless manner.

When such transfer of information between the ground air conditioning system and the aircraft is possible, the mixing chamber pressure is another parameter that can be used in the control module.

Furthermore, the knowledge of aircraft type and aircraft model year allows pre-defining in the control module corresponding operating modes, and namely the minimum and maximum pressure thresholds, whether the aircraft can be operated with sub-freezing air, etc. While aircraft type and aircraft model can be entered into the control module by the operator, this information could also be communicated by the aircraft to the control module, together with the temperature or pressure information in the mixing chamber, or cabin temperature. These and other embodiments of the present invention are recited in the appended dependent claims.

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
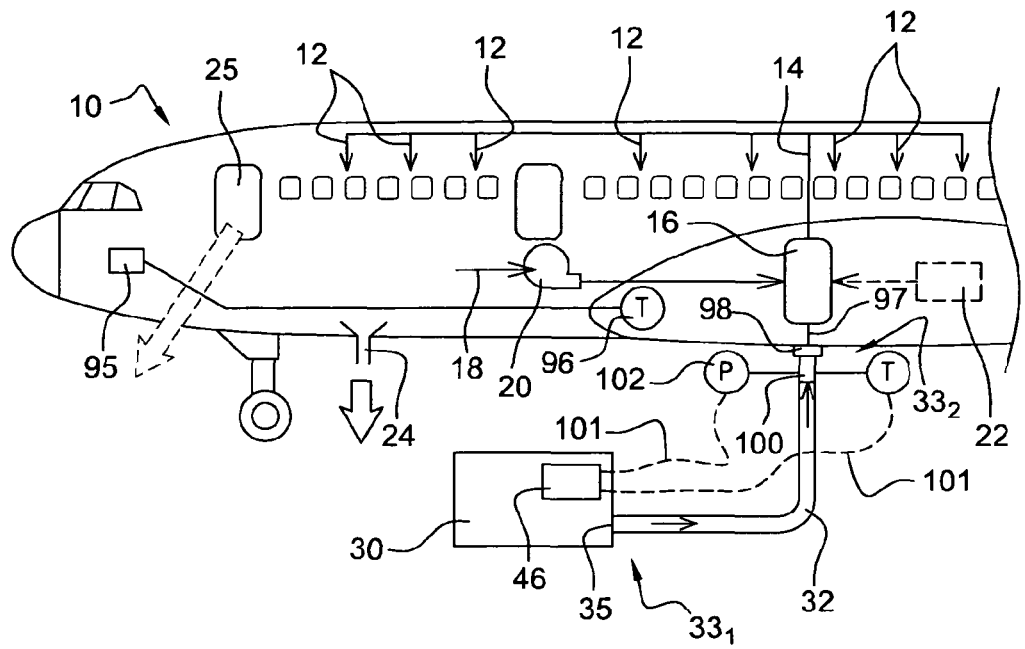
FIG. 1: is a sketch of the present system connected to an aircraft on the ground.

In FIG. 1, reference sign 10 indicates the front part of an aircraft parked on the ground. Arrows 12 symbolize air nozzles that deliver conditioned air at a predetermined temperature, say in the order of +8° C., into the cabin and to the passengers. The air nozzles 12 are part of the aircraft ventilation system that comprises a ventilation piping network 14 extending from a mixing chamber 16, in which the conditioned air is initially elaborated at a desired temperature. Cabin air is recirculated—via recirculation piping 18 under the action of recycling fans 20—from the cabin 10 into this mixing chamber 16, where it is mixed with fresh, cool air produced by the aircraft's own air conditioning units 22, commonly referred to as "air packs". As is known in the art, air packs 22 are units operating on the air cycle principle in order to produce cool air. A desired mixture of re-circulated cabin air and fresh, cool air is thus elaborated in the mixing chamber 16, so that cool conditioned air at about +4° C. is delivered into the ventilation network 14. A cabin ventilation air outlet, indicated 24, is located in the bottom of the fuselage. Another possible outlet way for cabin air is through an open cabin door 25.

On the ground, to avoid operation of the resource-consuming aircraft ventilation system, the air packs 22 are turned off and cool/cold, conditioned air is supplied to the aircraft from the ground by means of a ground pre-conditioned air unit 30 (hereinafter "PC air unit") connected to the mixing chamber 16 by means of an air hose indicated 32.

In the present variant, the PC air unit 30 is advantageously based on the air cycle principle. Furthermore, the unit 30 is connected to a remote compressor installation 34 (see FIG. 2), which produces compressed air that is in turn delivered to the unit via appropriate piping 36 (e.g. compressed air hoses and/or ducts). The remote compressor installation 34 can be located e.g. in a compressor room of the airport terminal or in a dedicated building and may typically include an ambient air compressor $34_1$ in series with a dryer $34_2$, the compressor $34_1$ being driven by a prime mover such as e.g. an electric motor $34_3$.

Figure 2:
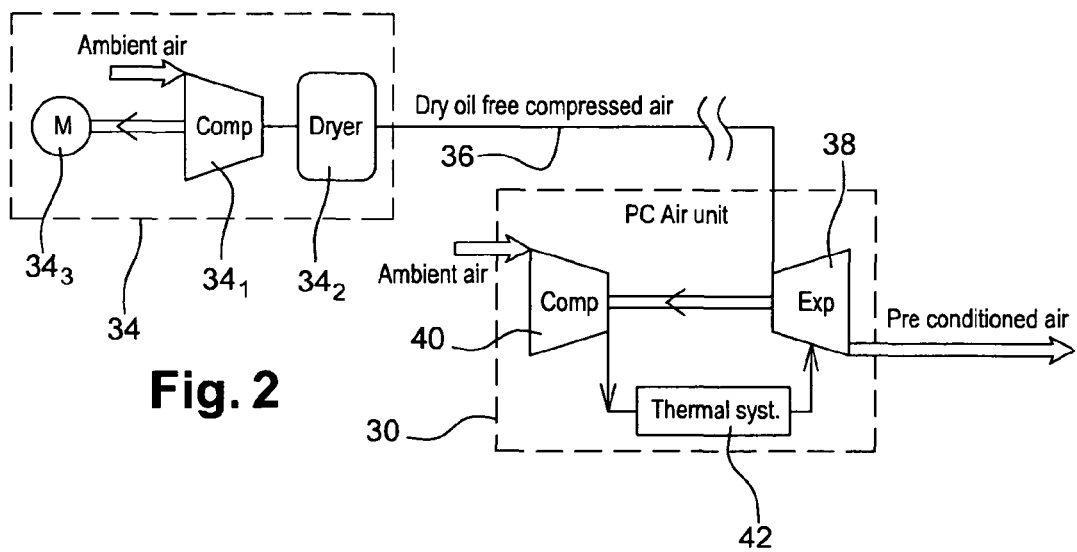
FIG. 2: is a principle drawing of the pre-conditioned air unit in FIG. 1 together with its remote compressor unit.

Such a configuration of PC air unit 30 combined with a remote compressor installation 34 is known to those skilled in the art, e.g. from WO 2004/024561, and is schematically illustrated with its main expander/compressor arrangement in FIG. 2. In the PC air unit 30, the remotely supplied compressed air passes through an expander device 38 and thus expands to lower pressure and temperature. Additionally, the expander 38 is coupled to an air compressor 40 that sucks in and compresses ambient air, which may be further supplied to the expander 38 in order to increase the expanded mass flow. Preferably, especially for operation in hot and humid environments, the locally compressed ambient air passes through a thermal system 42 (that may e.g. comprise a fan assisted heat exchanger in series with a dryer) before entering the expander 38. As is known to those skilled in the art, a centrifugal expander or a rotary screw expander may be used as the expander 38. It remains to be noted that FIG. 2 only illustrates the general principle of the air cycle PC air unit 30 combined with a remote compressor installation 34, but various designs may be devised for the actual operation of the PC air unit 30.

Reference sign 46 indicates a control module that controls the operation of the PC air unit 30.

The conditioned air produced in the PC air unit 30 is supplied to a parked aircraft through air hose 32. The air hose 32 has a first end $33_1$ connected to a pre-conditioned air outlet 35 of the PC air unit and a second end $33_2$ for connection to the aircraft. The second end (aircraft end) of the air hose 32 includes—for ease of operation—a connector 100 adapted for connection to an inlet port 98 in the aircraft's fuselage. Connection to the inlet port 98 gives access to the aircraft mixing chamber 16 represented in FIG. 1.

It shall be appreciated that in the present system, pressure sensing means are arranged in the vicinity of the aircraft connecting-end $33_2$ of the air hose 32, so as to measure the pressure of preconditioned air in this region of the air hose, i.e. as close as possible to the ground cooling connection point of the aircraft. The pressure measurement points are therefore preferably arranged within the last 0.5 m, more preferably within the last 0.3 m of the air hose, including the connector 100, when connected to the aircraft. In the advantageous embodiment illustrated in FIGS. 3 and 4, the pressure sensing means comprise a pair of pressure sensors indicated 102, which are integrated within the connector 100.

The use of a couple of pressure sensors 102 integrated within the connector 100 allows for redundant measurements. In FIG. 1, reference sign 101 indicates a wire assembly connecting the pressure sensors 102 with the control unit 46. Back to FIG. 3 the connector 100 comprises a sleeve-like element 104 having one end 106 adapted for holding the air hose (not represented in FIG. 3) and the other, opposite end 108 adapted for connection to the aircraft's inlet connector.

A pressure measurement piping system comprises at least one measurement-port 110 to the preconditioned air stream and the pressure sensors 102 are connected thereto. In practice, for improved security, the pressure measurement system is redundantly designed, as mentioned above. In the illustrated variant, four measurement-ports 110 are located in the sleeve wall 104: four tubes 112 open into the interior of the sleeve element 104 (forming the measurement ports 110) and are connected to a common air volume, i.e. ring pipe 116 (FIG. 4) surrounding the sleeve 104. Two pressure sensors 102 are connected to the ring pipe 116 at different circumferential locations.

Figure 3:
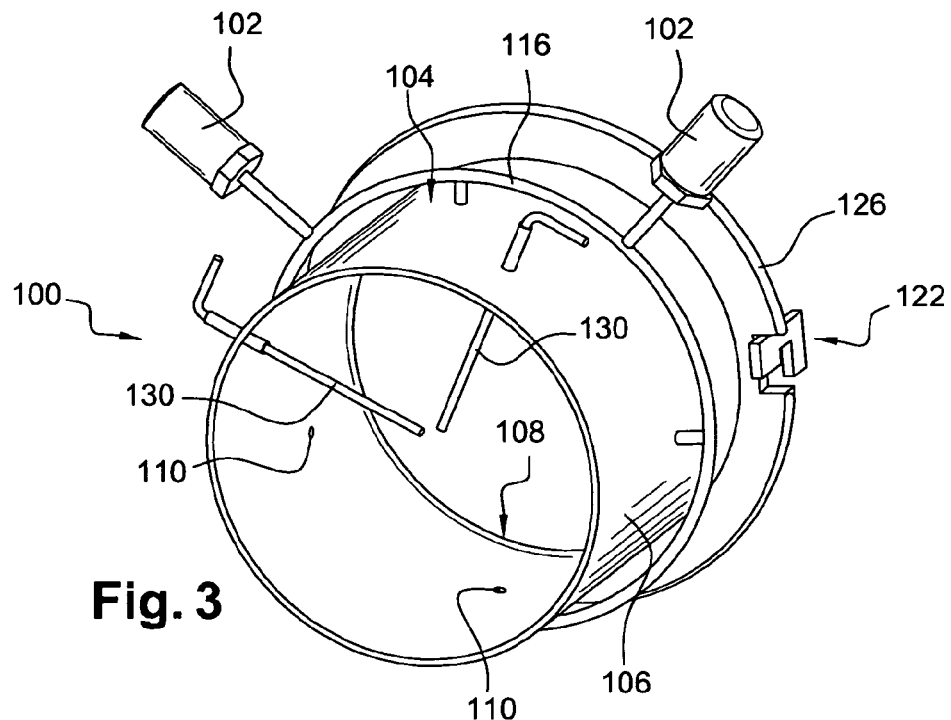
FIG. 3: is a perspective view (from the rear) of the connector mounted at the end of the air hose.
Figure 4:
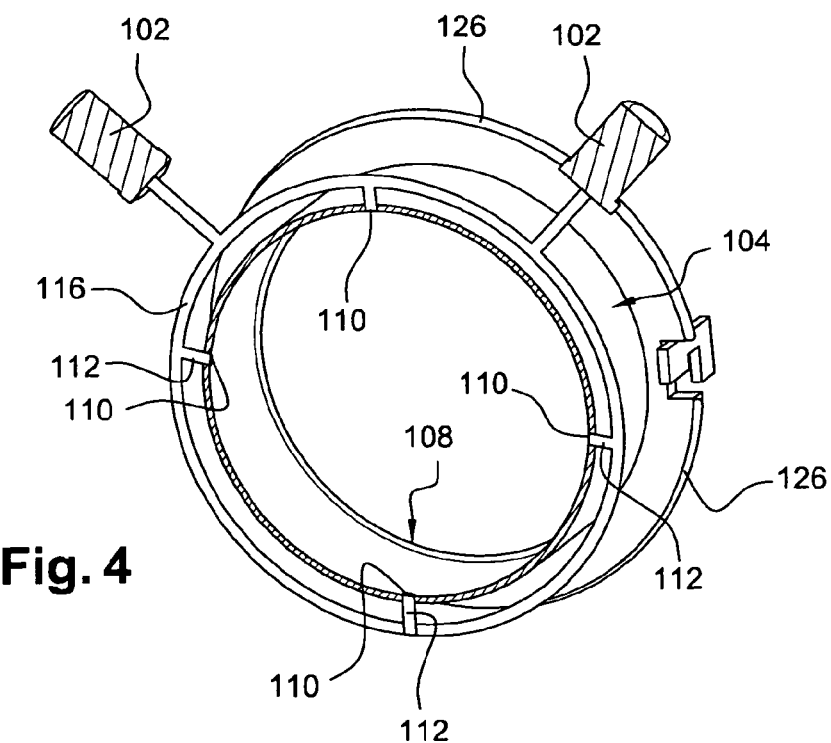
FIG. 4: is a principle view of the redundant sensor arrangement in the connector.

In practice, the pressure sensors 102 and measurement piping 112, 116 may be protected by a protective metal cover (not shown) affixed to the outer side of sleeve 104. Also integrated in the connector 100 is a pair of locking means 122 that engage with corresponding locking means in the aircraft inlet connector (not shown). For simplicity, only a locking hook 122 is shown in FIGS. 3 and 4, but such locking means may take any appropriate form. Also conventionally, a seal ring 126 is provided at the front end 108 of the connector 100. Such locking means 122 and seal ring 126 are known in the art and will not be further described herein. Finally, a pair of temperature sensors 130 may be arranged so as to radially protrude inside the sleeve element 104, while the mounting end of these sensors 130 may be housed within the metal cover. The temperature signals generated by sensors 130 may be carried by wires within the wire assembly 101.

From the control point of view, the actual feedback of the pressure measured by pressure sensors 102 allows a safe operation of the PC air unit 30. Indeed, the pressure values measured by sensors 102 reflect the static pressure of the pre-conditioned air stream flowing into the aircraft. Since the sensors 102 are arranged in close vicinity to the aircraft, the measurement is done at a location that is clearly strongly affected by the conditions inside the aircraft mixing chamber and adjacent ducting. Should one or more ducts of the aircraft's ventilation system become clogged or restricted by ice/snow, this will lead to a pressure build up, which will be observed by a rise in the inlet pressure as measured by the pressure sensors 102.

In this connection, it may be noted that in most aircrafts a small duct 97 with a butterfly/flap valve (not shown) connects the ground air inlet connector 98 with the mixing chamber 16. And the monitoring of the static inlet pressure allowed by the present pressure sensing means permits detecting clogging of the pipe 97 or valve, as well as clogging further downstream in the aircraft ventilation system.

As a result, the control unit 46 may be advantageously configured to stop the production/supply of conditioned air, or reduce the mass flow thereof if it is determined on the basis of the pressure signals (information) delivered by the sensors 102 that the inlet pressure has reached or exceeded a predetermined maximum pressure threshold.

Under normal operation, the control unit 46 may be configured to control the output flow of conditioned air to the aircraft on the basis of the measured pressure information (via pressure sensors 102) and of a target inlet pressure (set point). The values representing the actual pressure of preconditioned air and desired pressure of preconditioned air at the interface with the aircraft can be used as input parameters in any appropriate type of closed-loop control logic.

Another interesting aspect that can be controlled on the basis of the feedback from the pressure sensors 102 is whether the aircraft recycling fans are operating or not. As it has been explained above, an efficient cooling of the aircraft, when supplied with subfreezing conditioned air, requires that the recycling fans be running in order to prevent freezing conditions in the mixing chamber and the down-stream ducts. And the monitoring of the inlet pressure may also serve that purpose. Accordingly, the control unit 46 may be configured to determine whether the inlet pressure at the connection with the aircraft, before the supply of conditioned air, is equal to or less than a predetermined minimum pressure threshold. The predetermined threshold is calibrated to reflect flow conditions when the recycling fans 20 are turned off. In the affirmative, the control unit 46 shall preferably prevent the production of conditioned air and its delivery to the aircraft. Alternatively, in case the determined inlet pressure is equal or less than predetermined minimum pressure threshold, the control unit 46 may allow the delivery of conditioned air at positive temperatures (i.e. above freezing point) only, say from about +2° C.

As it will be understood, the target inlet pressure as well as the maximum and minimum pressure thresholds will depend upon the aircraft type.

Figure 5:
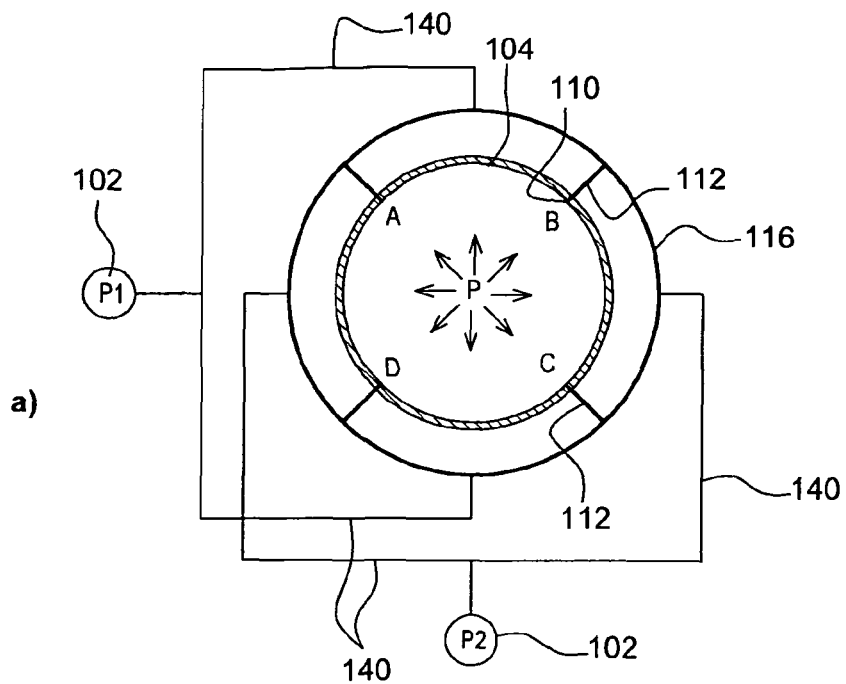
FIG. 5: shows views illustrating two setups for a redundant pressure monitoring.
Figure 5:
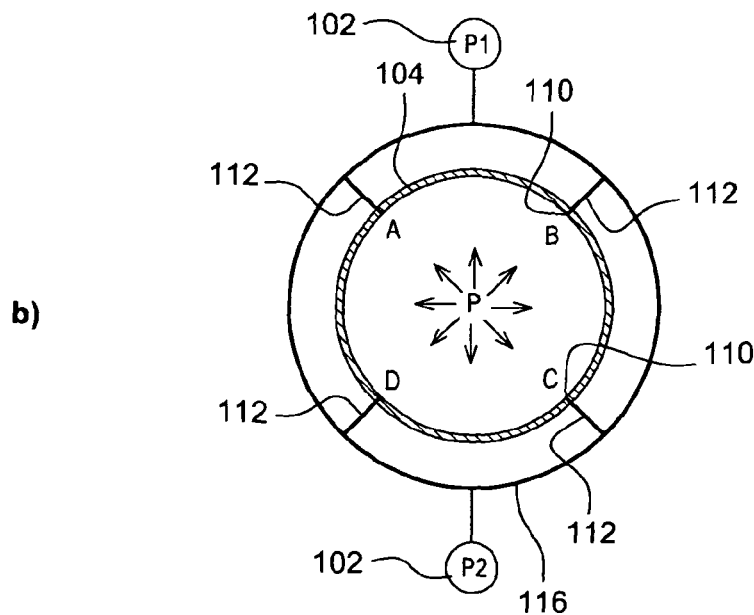

The safety level of the inlet pressure control depends on the reliability and redundancy of the measurement set up for the aircraft inlet pressure at connector. The principle of redundant measurement implemented in the embodiment of FIG. 4 is illustrated in FIG. 5*b*). The pressure sensors 102 are connected at different locations (here however opposite) on the measurement network formed by ring pipe 116.

In another possible embodiment illustrated in FIG. 5*a*), each pressure sensor 102 is connected with two branches of piping 140 that are each connected with ring pipe 116. The connection points of the branches 140 are arranged at equally distributed circumferential locations.

The configurations of FIGS. 5*a* and *b*) are redundant-since several pressure sensors and several measuring ports are connected to a common air volume (ring pipe), so that if one port 110 becomes clogged, or one sensor 102 is defective the measurement can still be effected through the others.

Thanks to the redundant design, the control unit can be configured so that if pressure information delivered from the sensors tends to sensibly diverge (i.e. the difference in static pressures from both sensors is greater than a predetermined threshold), the PC air unit 30 is operated in a safety mode, for example with a lower mass flow and/or by delivering preconditioned air at temperatures above the freezing point.

The advantage of having multiple pressure measuring ports 110 in the connector is:
- automatic determination of the average static pressure in the airflow despite a possible uneven pressure distribution (which could occur when the air hose is not straight near the measurement point)
- redundancy in case of one or several nozzles become blocked by ice.

For a further improved control of the supply of pre-conditioned air, the control module can be fed with additional input parameters usable for the closed loop control of the production of pre-conditioned air. Reference sign 96 indicates a temperature sensor arranged inside the mixing chamber 16. The temperature sensor 96 is conventionally linked to the computer system 95 in the cockpit. Preferably, this temperature information determined with sensor(s) integrated in the aircraft is transmitted to the control module 46 of the ground PC air unit 30, either wireless or through wires. The wired communication can be designed to pass the information through the connector 100 and cooperating inlet 98 so that electric contact is made upon coupling thereof. Typically, the temperature inside the mixing chamber should not drop below 2° C. Accordingly, the control module 46 may stop the production of sub-freezing pre-conditioned air when it determines that the temperature inside the mixing chamber 16 has dropped below about 2° C., or the PC air unit 30 can be operated with a decreased mass flow at temperatures above the freezing point.

Similarly, the temperature inside the cabin may also provide useful information for controlling the supply of pre-conditioned air.

Hence, the control unit may be configured to receive as input the mixing chamber and/or cabin temperatures, which may serve as basis for the control of the production of pre-conditioned air.

What is claimed is:

1. A system for providing pre-conditioned air to an aircraft on the ground, said system comprising:
    a ground air conditioner separate and apart from said aircraft for selectively producing pre-conditioned air;
    a controller in communication with said ground air conditioner, said controller selectively controlling an operation of said ground air conditioner;
    an air hose having a first end in communication with a pre-conditioned air outlet of said ground air conditioner, and a second end with a connector for connection to said aircraft on the ground;
    a pressure sensing means including at least one pressure sensor arranged in said connector, said pressure sensing means detecting operating conditions in a ventilation system of said aircraft when said connector is connected to said aircraft, including monitoring pressure at an inlet of the aircraft; and
    wherein a pressure sensing means provides pressure information from said pressure sensor to said controller so as to enable pressure monitoring of said pre-conditioned air in the vicinity of the second end of said air hose, said controller selectively controlling said ground air conditioning in dependence upon said pressure information to avoid over-pressurization in said ventilation system of said aircraft.

2. System according to claim 1, wherein said air conditioner operates on an air-cycle principle.

3. System according to claim 2, wherein said air conditioner is fed with remotely produced compressed air.

4. System according to claim 1, wherein said air conditioner is adapted to deliver sub-freezing pre-conditioned air into the aircraft, down to about −25° C.

5. System according to claim 1, wherein said controller is configured to stop the production or to reduce the mass flow of pre-conditioned air when said pressure information indicates that the measured pressure has reached or exceeds a maximum allowable pressure threshold.

6. System according to claim 1, wherein said controller is configured to unable the production or reduce the mass flow of pre-conditioned air when said pressure information indicates that the measured pressure has reached or dropped below a minimum pressure threshold.

7. System according to claim 1, wherein said controller is configured in order to output pre-conditioned air at a temperature above 0° C. when said pressure information indicates that the measured pressure has reached or dropped below a minimum pressure threshold.

8. System according to claim 1, wherein said controller regulates the output flow of pre-conditioned air on the basis of said pressure information and of a target pressure.

9. System according to claim 1, wherein said at least one pressure sensor is arranged no further than 0.5 m from said second end.

10. System according to claim 1, wherein said at least one pressure sensor is arranged no more than 0.3 m from said second end.

11. System according to claim 1, wherein said pressure sensing means comprises at least two pressure sensors, each pressure sensor being connected to a common ring pipe and at least two pipes extend from the ring pipe to an open port inside the connector wall, at the periphery of the flow of preconditioned air flow.

12. System according to claim 1, wherein said pressure information comprises static pressure information.

13. System according to claim 1, wherein said controller further takes into account information on the temperature inside an aircraft mixing chamber.

14. System according to claim 1, wherein said controller stores a map of operating modes, including maximum allowable pressure and minimum pressure, that correspond to respective aircraft types and model year, these parameters being taken into account for controlling operation of said ground air conditioner.

15. System according to claim 1, wherein said controller is configured to received from said aircraft, through wired or wireless connection, information regarding one or more of: aircraft mixing chamber temperature, aircraft mixing chamber pressure, aircraft type, aircraft model year and aircraft cabin temperature.

16. System according to claim 13, wherein said controller further takes into account information on the temperature inside the cabin of the aircraft.

17. System for providing pre-conditioned air to an aircraft on the ground comprising:
a ground air conditioner configured to produce pre-conditioned air;
a controller controlling operation of said ground air conditioner;
an air hose having a first end in communication with a pre-conditioned air outlet of said ground air conditioner and a second end with a connector for connection to an aircraft on the ground;
wherein a pressure sensing means provides pressure information to said controller and is arranged so as to allow pressure monitoring of the flow of pre-conditioned air in the vicinity of the second end of said air hose, said pressure sensing means including at least one pressure sensor arranged in said connector and being configured to detect predetermined events in a ventilation system on-board said aircraft, including at least one of clogs, restrictions and fan operation in said ventilation system.

* * * * *